Nov. 26, 1968 T. J. ARNESON, JR 3,412,976
VACUUM HELD HYDROSTATIC ROTOR
Filed Feb. 8, 1967 2 Sheets-Sheet 2
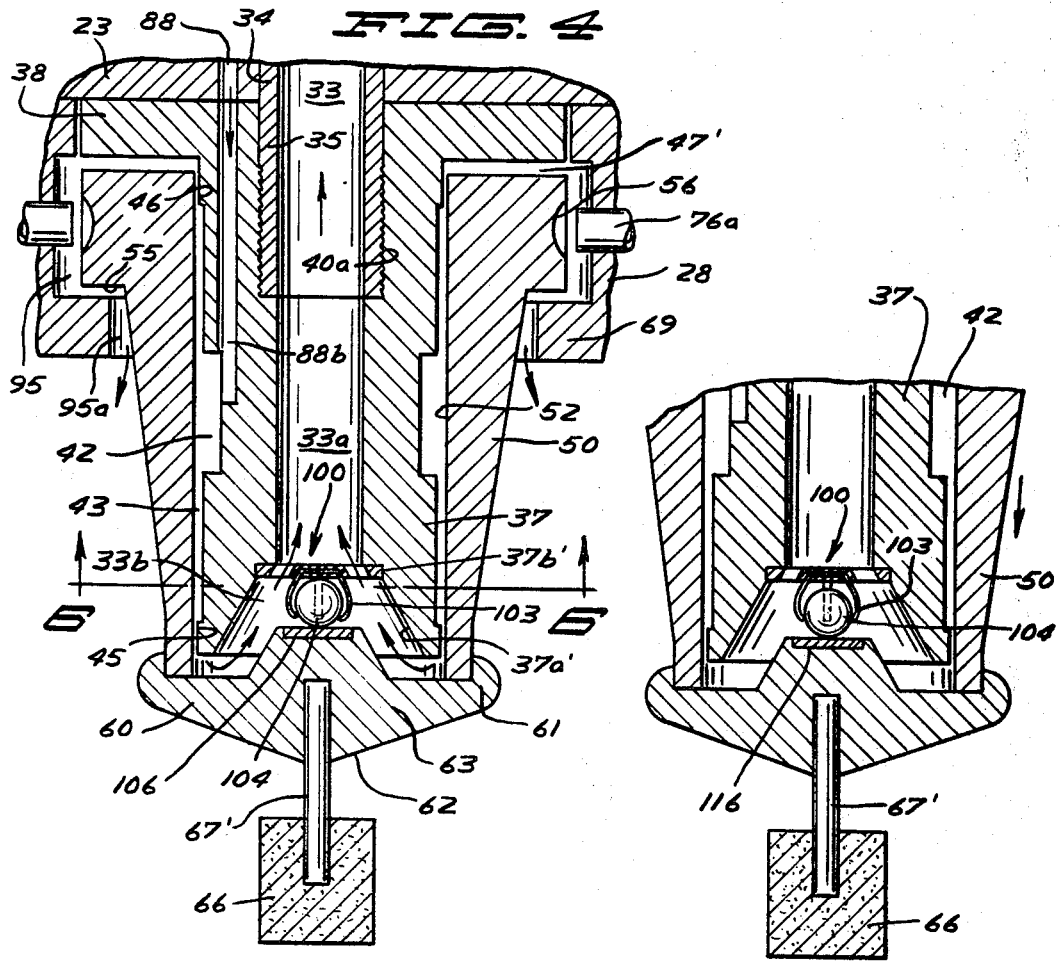
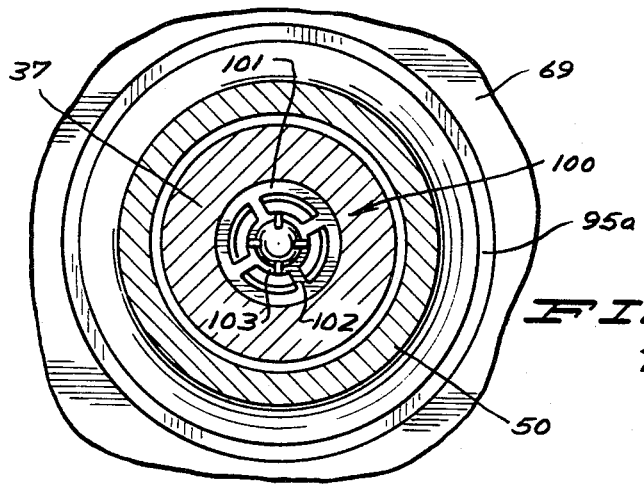
INVENTOR.
THEODORE J. ARNESON JR.
BY
Rafael Gregory
ATTORNEYS United States Patent Office 3,412,976
Patented Nov. 26, 1968

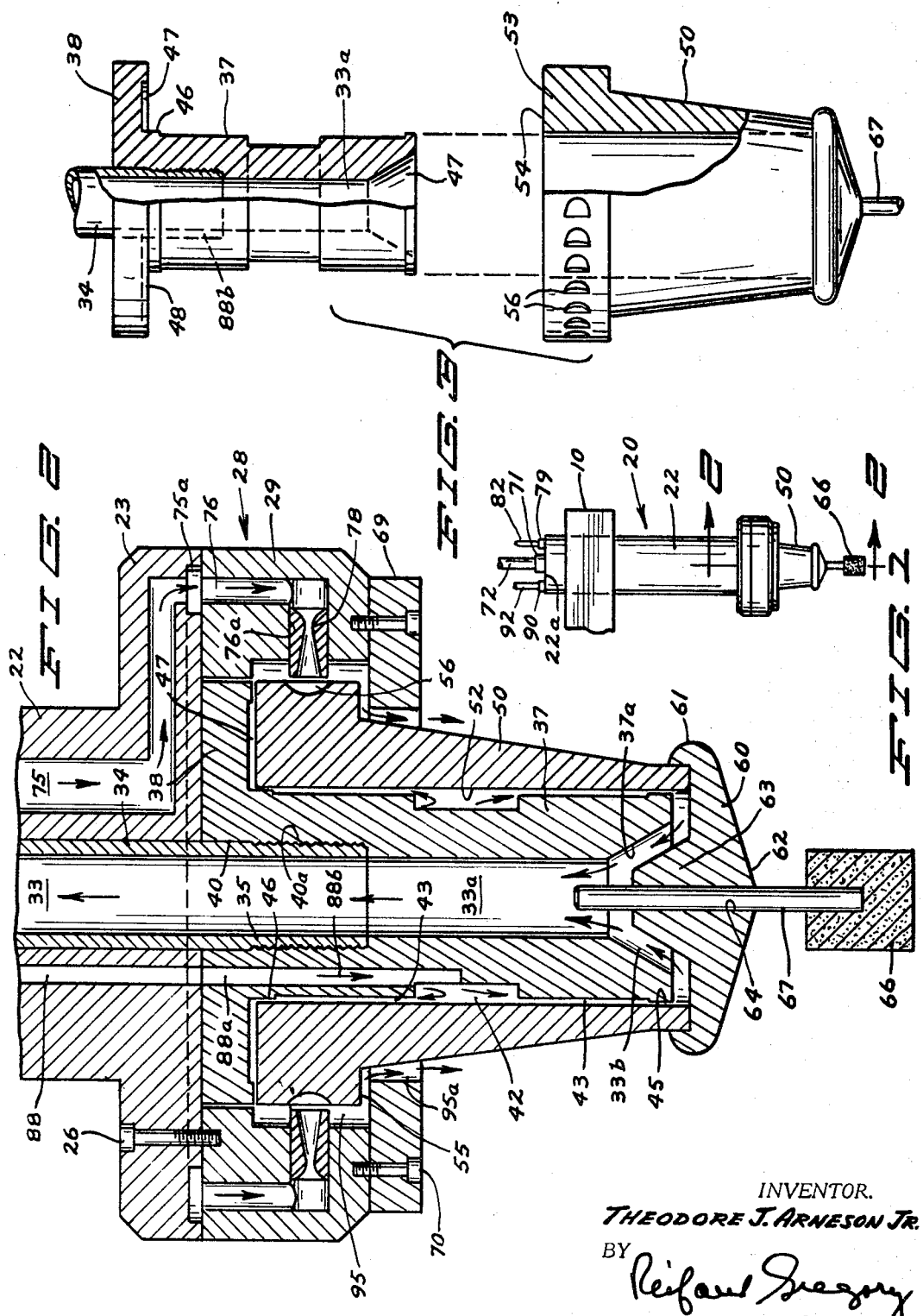

3,412,976
VACUUM HELD HYDROSTATIC ROTOR
Theodore J. Arneson, Jr., % Professional Instruments Co., 4601 Highway 7, Minneapolis, Minn. 55416
Filed Feb. 8, 1967, Ser. No. 614,673
10 Claims. (Cl. 253—2)

ABSTRACT OF THE DISCLOSURE

A rotatable tool or work piece holding device which in connection with a vacuum recess is held in operating position by atmospheric pressure against a thrust pad, said device being slidably removable by interruption of the vacuum and being oriented in operating position by hydrostatic means.

BACKGROUND AND SUMMARY OF THE INVENTION

The invention herein broadly relates to a vacuum held hydrostatically oriented rotor with specific reference being had to a tool or work piece holding device such as on the order of a spindle.

By way of example, a spindle is commonly used to hold tools such as grinding wheels. The grinding wheel is dressed and trued with respect to the spindle. Frequent replacement of the grinding wheel is required as it becomes worn. Replacement results in work stoppage of some extent while the replacement grinding wheel is installed, dressed and trued.

It is desirable to provide a relatively inexpensive interchangeable spindle whereby a standby supply of spindles equipped for use may be prepared in advance and exchanged by merely being slipped onto a supporting bearing, with no further adjustment being required.

It is an object of this invention therefore to provide a device comprising a quickly exchangeable tool or work piece holding member.

It is another object of this invention to provide a quickly detachable tool or work piece holding member such that like holding members are readily interchangeable therewith ready for use without the requirement of adjustment whereby very little delay is experienced in the interruption of work in process.

It is a further object of this invention to provide a rotating member which is hydrostatically oriented in operating position and which in connection with a vacuum recess is held in position by atmospheric pressure.

More specifically with reference to the previous objects it is an object of this invention to provide a quickly exchangable spindle so arranged as to be removable from its operating position by merely being drawn off of a supporting bearing upon the interruption of a vacuum.

It is also an object of this invention to provide a work piece or tool holding member comprising a spindle, a supporting bearing for said spindle, hydrostatic means orienting said spindle on said bearing, a vacuum recess in connection with said spindle providing for its support by atmospheric pressure, and means driving said spindle.

These and other objects and advantages of the invention will be set forth in the following description made in connection with the accompanying drawings in which like reference characters refer to similar parts throughout the several views and in which:

FIG. 1 is a broken view in elevation of the device herein on a reduced scale;

FIG. 2 is a broken view vertical section on an enlarged scale taken on line 2—2 of FIG. 1 as indicated;

FIG. 3 is an exploded view in elevation of a portion of the device herein partially in section with some portions being broken away;

FIG. 4 is a broken view in vertical section similar to FIG. 2 showing a modification;

FIG. 5 is a broken view in vertical section showing a portion of the structure in FIG. 5 in an alternate position; and FIG. 6 is broken view in horizontal section taken on line 6—6 of FIG. 4 as indicated.

DESCRIPTION OF THE PREFERRED EMBODIMENT

Referring to the drawings and more particularly to FIG. 1, the device 20 herein is indicated being carried or supported in operating position by a conventional type of mounting bracket 10.

In the embodiment of the invention here disclosed, said device is shown comprising a generally cylindrical housing 22 having its upper portion broken away and having its lower end terminate as an annular flange portion 23. Depending from said flange portion and secured thereto as by bolts 26 is a shroud 28 formed as a cylindrical collar and having a side wall 29.

Said housing 22 has an axial bore or passage 33 therethrough having a sleeve 34 press fit therein, with said sleeve having a depending exteriorly threaded portion 35.

A substantially cylindrical stator 37 forming a bearing is provided having an upper cylindrical flange 38, which in the present embodiment forms a thrust bearing pad, and having an axial bore or passage 33a extending therethrough as a continuation of the passage 33. Said stator has an upper counter bore portion 40 having a lower interiorly threaded portion 40a to receive said depending threaded portion 35.

Said flange portion 38 will have a diameter such as to be received within said shroud 28. Said bearing 37 has an axial recess 37a frusto conical in form at its lower end portion.

Said stator 37 has an annular groove 42 thereabout substantially centrally thereof and has extending at either side of said groove a relatively wide shallow recess 43 having annular boundary or terminal lands 45 and 46 adjacent either end of said stator. With respect to said lands, said recess 43 will preferably have a depth on the order of .0002 inch.

The underlying surface of said flange or bearing pad 38 may be variously formed and is here shown having a relatively wide underlying recess 47 having an annular boundary land 48. The depth of said recess relatively to said land may be on the order of .0002.

Adapted to be journaled onto said bearing or stator 37 is a rotor 50 forming a spindle. Said spindle is here shown being generally frusto conical in form having an axial bore 52 therethrough to receive said bearing 37. Said bore preferably will have a diameter such as to provide a clearance on the order of .0002 inch with respect to the annular lands 45 and 46. Thus passages are formed between the opposing surfaces of said bearing 37 and its thrust pad 38 with respect to said spindle 50. The passages are indicated by the numerals indicating the respective lands and recess defining said passages.

The upper portion of said rotor comprises an annular shoulder 53 having a diameter corresponding to that of said bearing pad 38. Formed within the peripheral side wall of said shoulder and extending thereabout are recesses 56 here shown to be somewhat arcuate in form on the order of a conventional type of turbine bucket. Vanes are regarded as equivalents to said buckets. In effect said member 50 may be regarded as a turbine rotor or turbine spindle. Said spindle has an upper surface 54 opposing the adjacent surface of said bearing pad 38 and has a surface 55 underlying said shoulder portion.

Said spindle 50 extends downwardly somewhat below said bearing 37 and will have a closed outer or lower end which is here shown capped by a closure member 60 shown having a convex outer surface 62 and an annular shoulder 61 press fit about said spindle with a frustoconical hub portion 63 extending into said axial recess 37a and forming a passage 33b in connection therewith. Said closure member 60 is here shown adapted to hold a tool or work piece for which purpose it is here shown having an axial passage 64 to receive the shank 67 of a tool 66 such as of the grinding wheel here shown. Said shank may be may be press fit or cemented.

Forming a retainer for said spindle 50 is a ring 69 which underlies the shroud 28 and extends inwardly sufficiently to underlie a portion of the shoulder 53. Said retaining ring may be secured as to said shroud by bolts 70.

The upper end of said housing 22 is enclosed by the end wall 22a. Projecting from said end wall is a nipple 71 having a vacuum line 72 running therefrom and having communication with said passages 33, 33a and 33b. Said passages form a vacuum tube. The lower end passage portion 33b is frustoconical in form confined between the lower end portion of the bearing 37 and the upward projection of the closure member 60. Said line 72 will run to a suitable vacuum pump not shown.

Extending down through the body portion of said housing 22 and angled through its flange portion 23 as shown, is a passage 75 terminating in an annular open-bottom passage 75a in the underlying face of said flange. A plurality of passages 76 in register with said passage 75a extend inwardly of said shroud 28 having inwardly angled terminal portions 76a extending to the inner annular wall of said shroud. Disposed in said passages 76a as by a press fit are jet nozzles 78 in register with the buckets 56 of the shoulder or turbine 53. Thus said shroud forms a turbine jet housing. Said passage 75 at its upper end terminates in a nipple 79 from which an air line 82 extends to a suitable supply of air under pressure.

A third passage 88 extends down through said housing 22 having a nipple 90 capping its upper end and extending from said nipple to a suitable supply of air under pressure is a line 92. Said passage 88 has a portion 88a extending through said flange or thrust pad 38 and a further portion 88b thereof extending down through the bearing 37 terminating in said annular groove or supply passage 42.

The shoulder 53 has a lesser diameter than the inner diameter of the shroud 28 providing a passage 95 therebetween. A continuation 95a of the passage 95 extends between the ring 69 and the adjacent surface portion of the spindle 50 and exhausts to the atmosphere.

The passages 43 and 33b communicate over the land 45. The passage 47 communicates with the passage 43 over the land 46 and with the passage 95 over the land 48.

Thus it is seen that a stepped clearance is formed between surface portions of the bearing 37 and the facing surface portions of the spindle, 50, as above described. Said clearance in the passage 43 is preferably on the order of .0004 inch and the clearance at the lands 45 and 46 is preferably on the order of .0002 inch. Air under pressure is supplied by the line 92 through the passages 88–88b and the supply groove 42. An externally pressurized hydrostatic radial bearing structure is thus formed. The stepped clearance in the surface of the thrust pad formed by the recess 47 and the lands 48 and the opposing surface of spindle 50 forms a similar bearing structure which functions as a thrust bearing to axially position the spindle 50 in operation.

OPERATION

The assembly of the device herein is believed to be quite clear from the description given.

The clearance between the stepped surfaces of the bearing 37 and the opposing surfaces of the turbine spindle 50 must be within operating limits for externally pressurized step bearing structures. A preferable clearance has been indicated here for orientation of the spindle with respect to the bearing. The air supply to support the operation of the bearing structure for the purpose indicated is suitably on the order of 150 p.s.i. Thus interchangeable spindles may be mounted or slipped onto the bearing 37 and a continuous uniform result will be secured from the operation of the grinding wheel 66. There are no bearings to fit, adjust or to wear. An unusually precise operating device is provided.

The spindle is here indicated as being driven by air under pressure supplied through the jet nozzles 78. Air pressure ranging from 20 p.s.i. to 100 p.s.i. may be required depending on the speed required and the work being done.

An unusually novel and simplified holding means is provided for the spindle whereby it is retained in operating position by atmospheric pressure against the hydrostatic thrust bearing 38. This is effected by drawing a vacuum through the bore or passage 33–33a–33b of the housing and bearing. A vacuum drawn on the order of 20 inches is adequate for holding the spindle in position. Atmospheric pressure forces the spindle against the thrust pad 38. The thrust pad axially positions the spindle very accurately. A smooth running relatively trouble free operation results.

To remove the spindle 50, the retaining ring 69 is removed, the vacuum is interrupted and upon its interruption, the spindle simply slips off or drops away from the bearing. A replacement spindle is slipped up onto the bearing, the vacuum is applied and the work in process is continued. The retaining ring holds the spindle in position at such times as the vaccum is discontinued.

The term "air" as used herein is intended to embrace any gas which may be suitable for use. The inventive scope herein embraces the use of liquid for bearing support and/or for driving the turbine. Suitable modification will be required for the use of a liquid.

MODIFICATION

A modification of the device herein is shown in FIGS. 4–6 and has to do principally with a change in the structure of the thrust bearing in connection therewith.

All portions of the modified structure identical with those of the device above described are indicated by like numerals and are not further described.

A portion of the annular flange 23 is shown with a broken portion of the shroud 28 depending therefrom. Only a portion of the retaining ring 69 is shown.

The underlying surface of said flange 38 has been modified and in lieu of the recess 47 and boundary land 48, it is shown as a uniform surface 47'.

The frustoconical recess 37a at the lower end of said bearing 37 has been somewhat enlarged and is indicated by the numeral 37a'. An annular shoulder 37b' is formed at the inner end of said recess and secured thereto is a thrust bearing 100 which may be variously formed and which in this embodiment is shown as a spider comprising a flat annual ring 101 underlying said shoulder and having a radial depending fingers 102 supporting a cage 103 to overlie and partially embrace and retain a ball 104 exposing the lower portion of said ball and allowing it to have rotational movement.

The closure member 60 is modified to the extent of having its frustoconical inward projecting portion somewhat shortened and it is indicated by the numeral 63'. Embedded into the upper facing surface of said portion 63' and centered beneath said ball 104 is a bearing or wear plate 106.

The shank 67 of the tool 66 is shown extending only partially into said member 60 being received and secured within the axial bore 64'.

OPERATION

The operation of the modified structure is substantially the same as that of the structure first above described. The use of the ball thrust bearing 100 appears to provide a stiffer thrust than is present in the use of the step bearing arrangement present in the device first above described. Thus the grinding tool 66 may be more accurately and more steadily fixed in its axial position.

With the rotor 50 in operating position, the wear plate 106 will bear against the bearing 104. During non-operational periods the bearing is readily moved in its cage sufficiently to avoid any flat points being worn thereon by said wear plate.

Thus it is seen that I have provided a very simple structure comprising a device allowing quick and accurate replacement of the work tool and its holding member and providing a trouble free structure which has been unusually successful in operation.

The scope of the invention herein embraces a rotor which may have uses other than holding a tool or work piece. The rotor may have uses such as a drum to perform functions merely through the process of rotation.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. a vacuum held hydrostatic bearing structure having in combination,
   a stator,
   a rotor in connection with said stator,
   said stator and rotor forming said hydrostatic bearing structure,
   said structure having a chamber therein communicating with said sator and said rotor,
   said structure having a passage therein communicating with said chamber, and
   means in connection with said structure drawing a vacuum through said passage.

2. The structure set forth in claim 1, including means driving said rotor.

3. The structure set forth in claim 1, including means enclosing the free end of said rotor.

4. The structure set forth in claim 1, including buckets disposed about said rotor, and
   means in connection with said rotor supplying air under presure to engage said buckets.

5. The structure set forth in claim 1, wherein
   said stator comprises a radial and a thrust bearing,
   said rotor comprises a spindle journaled onto said stator whereby said rotor is hydrostatically oriented with reference to said stator.

6. The structure set forth in claim 1, wherein
   said stator comprises a radial bearing,
   said rotor comprises a spindle journaled onto said stator,
   a thrust bearing in connection with said stator axially locates said rotor, and
   said rotor has a portion underlying said stator having said chamber adjacent thereto.

7. The structure set forth in claim 1, wherein
   said stator is substantially cylindrical in form, has an annular groove thereabout and has a shallow annular recess extending at either side of said groove and terminating in annular boundary lands,
   said rotor has a bore therethrough of such diameter as to provide suitable clearance with respect to said recess and said lands about said stator to form said hydrostatic bearing structure,
   said stator has a passage therein in communication with said annular groove, and
   means supply air under pressure to said passage for supporting and orienting said rotor with respect to said stator.

8. The structure set forth in claim 1, including
   pivot means carried by said stator and mounted axially thereof, and
   means carried by said rotor engaging said pivot means for axially positioning said rotor with respect to said stator.

9. A vacuum held hydrostatic rotor having in combination,
   a stator comprising a radial and a thrust bearing,
   a rotor comprising a spindle in connection with said stator,
   said rotor and said stator in combination comprising said hydrostatic bearing structure,
   means in connection with said rotor driving the same,
   said stator and rotor defining said chamber therebetween,
   said stator having a passage therein in communication with said chamber, and
   means drawing a vacuum through said passage.

10. The structure set forth in claim 9, including
    means enclosing the free end of said rotor, and
    said means being adapted to hold a tool or work piece.

References Cited

UNITED STATES PATENTS

| | | | |
|---|---|---|---|
| 2,138,999 | 12/1938 | Clark | 170—135 |
| 3,132,426 | 5/1964 | White | 253—3 X |
| 3,138,870 | 6/1964 | Stachon | 253—59 X |
| 3,189,999 | 6/1965 | Reiter | 253—2 X |

EVERETTE A. POWELL, JR., *Primary Examiner.*